(No Model.)

A. S. ADAMS.
AUTOMATIC TONGS.

No. 273,243. Patented Mar. 6, 1883.

Witnesses.
L. W. Miller.
John R. Snow.

Inventor.
Alonzo S. Adams
by J. E. Maynadier
his Atty.

UNITED STATES PATENT OFFICE.

ALONZO S. ADAMS, OF BOSTON, MASSACHUSETTS.

AUTOMATIC TONGS.

SPECIFICATION forming part of Letters Patent No. 273,243, dated March 6, 1883.

Application filed November 8, 1882. (No model.)

*To all whom it may concern:*

Be it known that I, ALONZO S. ADAMS, of Boston, in the county of Suffolk and State of Massachusetts, have invented certain new and useful Improvements in Automatic Tongs, of which the following is a specification.

My invention relates to improvements in tongs, more especially adapted for light domestic use, of the class in which the tines are automatically closed on any article to be picked up.

My invention consists of a hollow handle, in which is inclosed a rod controlled by a spring, and two sets of movable tines or the like pivoted to the handle and connected to the inclosed rod. My objects are to cause the two sets of tines to separate by depressing the inclosed rod, and to approach each other to grasp and hold the article between them when the rod is released, and to provide facilities for cleaning the interior parts.

The accompanying drawings illustrate automatic tongs embodying all my improvements.

Figure 1:
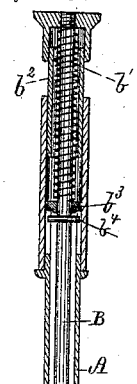
Figure 2:
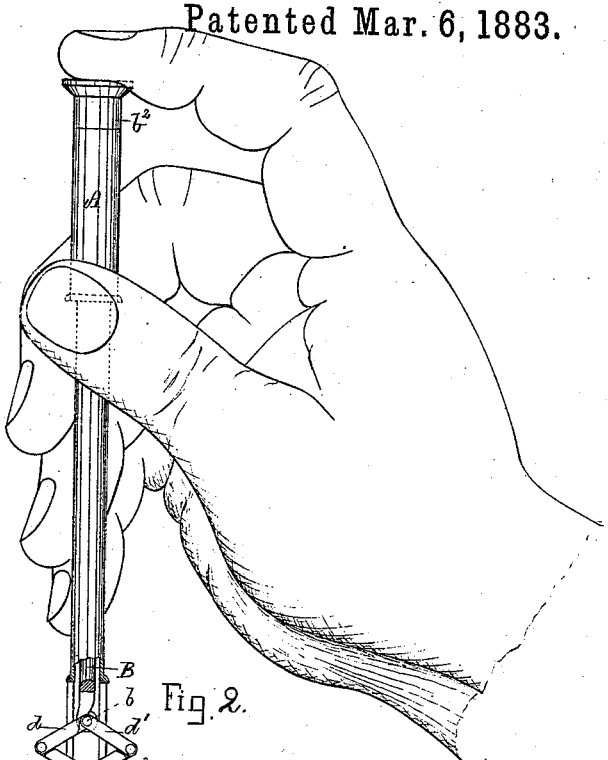
Figure 3:
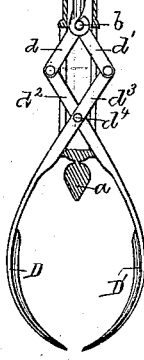
Figure 4:
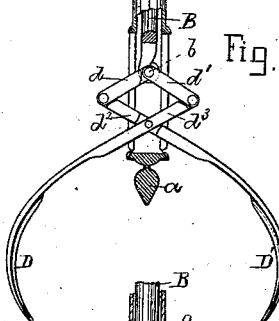
Figure 5:
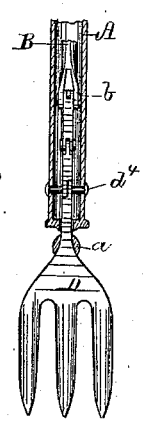
Figure 5:
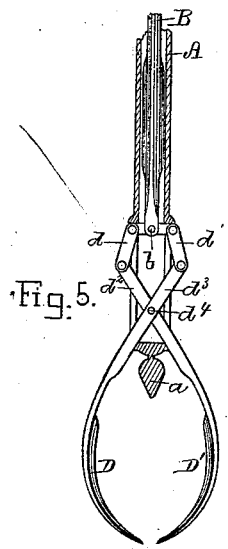

Figure 1 is a longitudinal section, showing the tines held together by the spring. Fig. 2 is an elevation, partly in section, showing the inclosed rod depressed and the tines separated. Fig. 3 is a sectional side view, showing the tongs and that part of the handle to which the tongs are pivoted; and Fig. 4 is a modification showing a spring formed from the rod and connecting it to the tongs. Fig. 5 is a modification of the link-connections.

The handle A (of any desired exterior design, and of a length best adapted to the purposes for which the implement is intended) is made hollow to receive a rod, B. This rod B is preferably rolled from a rod nearly the size of the interior hollow space of the handle A, so as to leave a part of the original size to serve as a guide. The end of this rod receives the pivot $b$, that connects the lower end of the rod B to the links $d\ d'$, pivoted to the arms or handles $d^2\ d^3$ of the forks D D'. To give the requisite bearing for the pivot $b$ when the rod is small, I slit the end of the rod B sufficiently to allow each part to be bent sidewise to the form of a ring. I thereby not only save drilling a hole, but also get much more metal around the pivot. A simple way of making the spring and having it serve as links for connecting the inclosed rod to the handles of the tongs is illustrated in Fig. 4, and consists in dividing the end of a rod made of spring metal into two parts, and connecting these parts to the handles of the tongs; or two flat springs may be fastened to the end of the rod and connected, as aforesaid.

The forks D D' are of any desired construction. Obviously their sizes and shapes will vary for different purposes—as, for instance, one may be a spoon and the other a large fork when used for salad; or both may be large forks, with wide-spreading tines, as in the ordinary asparagus-forks. They are joined by a pivot, $d^4$, secured in the handle A, and, with their arms or handles $d^2\ d^3$, form a pair of tongs consisting of two parts crossing each other and joined at their point of crossing by a pivot, $d^4$. This pivot $d^4$ is mounted in the hollow handle. The arms $d^2\ d^3$ of the crossed parts form the handles of the tongs, and are connected by the links $d\ d$ to the rod B. The axis of the tongs is fixed relatively to the hollow handle, and this is the distinguishing feature of my invention.

I am aware of Patent No. 163,003, of May 11, 1875, to De Leidi, and disclaim all therein shown, for in all the devices shown in that patent the axis upon which the arms of the tongs turn has a motion toward and from the hollow handle, while in my device this axis is mounted upon the hollow handle.

It will be apparent that when the rod B is pushed down, the arms $d^2\ d^3$ will be forced apart and the points of the tongs be separated, and when the rod B is raised these points will be brought toward each other. The downward motion of the rod B is effected, as desired, by pressing on its top, which projects above the handle A for that purpose, and the upward motion is effected by a spring, $b'$, inclosed in a receptacle, $b^2$, which is screwed onto the top of the rod B, and slides either inside or outside of the handle A. A point or projection, $a^5$, is formed on the end of the handle A, which enters any small soft object—such as an olive, pickle, or the like—which may pass between the points of the tongs. A washer, $b^3$, through which the rod B moves, rests on a shoulder, $a$, formed on the handle A, and supports the spring $b'$ and receives its thrust. A pin, $b^4$, is secured to the rod B and moves in grooves on the inside of the handle A. This pin prevents the rod from turning when the receptacle $b^2$ is being screwed on, and keeps the links, tongs, and their pivots free from the strain.

The advantages arising from the above-described manner of attaching and securing the spring and its receptacle or the cap, when the spring is made as in Fig. 4, are that all these parts can be readily removed and allow free access to the interior of the handle for the purpose of cleaning that part when desired.

The operation of the tongs will be readily understood from the foregoing description, aided by the drawings.

I claim as my invention—

1. The combination, substantially as hereinbefore set forth, of a pair of tongs consisting of two parts crossing each other and joined at their point of crossing by a pivot, a hollow handle, in which said pivot is mounted, a rod passing through this hollow handle and connected to the inner extremities of the tongs, and a spring acting on this rod with a tendency to keep the tongs closed, as and for the purposes specified.

2. In self-closing tongs, the actuating-rod having a spring surrounding its free end, in combination with a loose washer supporting one end of the spring, and a cap or receptacle screwed onto the rod to inclose the spring and support its other end, the washer, spring, and receptacle being adapted to be removed, substantially as and for the purposes set forth.

ALONZO S. ADAMS.

Witnesses:
W. A. COPELAND,
J. R. SNOW.